Feb. 9, 1926.

E. J. VON PEIN

1,572,054

CASH REGISTER

Filed May 12, 1919

Inventor
EDWARD J. VON PEIN

Feb. 9, 1926.

E. J. VON PEIN 1,572,054

CASH REGISTER

Filed May 12, 1919　　　　7 Sheets-Sheet 2

FIG. 2

Inventor
EDWARD J. VON PEIN
Carl Beust
Henry Stauffer
Attorneys

Feb. 9, 1926.  
E. J. VON PEIN  
CASH REGISTER  
Filed May 12, 1919

Inventor  
EDWARD J. VON PEIN  
Attorneys

Feb. 9, 1926.  
E. J. VON PEIN  
CASH REGISTER  
Filed May 12, 1919

Feb. 9, 1926. 1,572,054
E. J. VON PEIN
CASH REGISTER
Filed May 12, 1919 7 Sheets-Sheet 6

Inventor
EDWARD J. VON PEIN

Feb. 9, 1926.

E. J. VON PEIN

1,572,054

CASH REGISTER.

Filed May 12, 1919

Inventor
EDWARD J. VON PEIN
Attorneys.

Patented Feb. 9, 1926.

1,572,054

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO.

CASH REGISTER.

Application filed May 12, 1919. Serial No. 296,603.

*To all whom it may concern:*

Be it known that I, EDWARD J. VON PEIN, a citizen of the United States, residing at Dayton, in the county of Montgomery and State of Ohio, have invented certain new and useful Improvements in Cash Registers, of which I declare the following to be a full, clear, and exact description.

This invention relates to accounting machines and more particularly to those which in addition to making a record of transactions upon a totalizer, make an additional record of all transactions by printing each item upon a record strip.

An object of this invention is to provide an accounting machine mechanism for the accounting of fares collected under the zone mile system used in passenger transportation.

Specifically, it is an object of this invention to provide means for printing the amount of the fare, the character of the fare, the zone in which it is paid, the direction of the trip, and the conductor's number, and means for displaying the amount of the fare, the direction of the trip and the zone in which the fare is collected.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

In order that the detailed description which is to follow will be better understood a general statement of the functions performed by the improved machine and a general description of the mode of operation thereof will be given here.

The invention has been shown applied to the type of machine fully shown and described in the above mentioned Cleal patents, but it is to be understood that the invention may be applied to many other types of machines and that therefore it is not intended to limit the invention to the specific application shown in the drawings.

The successful principle of registration of zone fares involves visible registration of the fare; showing not only that the fare has been collected but the amount paid as well. This principle of a practicable register for zone fares is embodied in the modern cash register, whose distinguishing characteristic is the ability to register sums of varying amounts as different keys are depressed, the amount registered being shown plainly by an indicator visible alike to the passenger paying the fare, the conductor or anyone in the car.

A cash register of this principle has in addition to the item indicators, a zone indicator, showing both to the passenger and to the conductor the zone in which the machine is then set. There is also provided a mechanism which locks the machine and prevents its operation except when a key bearing a serial number is inserted in the machine and held therein. The printing mechanism is arranged to record on the record strip not only the amount rung up on the register, but to show, in addition, for each amount so registered the zone indication as it appeared at the time the registration was made, and the number on the key inserted in the register to unlock it, which was the number of the conductor then operating the register.

In addition to the regular amount or item keys there is provided a ticket key which records employees' free tickets, transfers and other paper tickets. When a free ticket is registered a symbol is printed on the detail strip. Where a passenger presents a transfer and pays his zone mile rate for the journey taken on the transfer, the detail strip shows both the symbol and the amount of money, indicating that the transaction represents a ride on a transfer.

The register contains two counters and a totalizer; one counter shows the total number of registrations made, whether cash or ticket. The second counter shows the number of tickets registered including not only free tickets but transfers. The totalizer shows the registrations of cash. If the counters and totalizer are constructed so as not to be reset to zero, then from the opening and closing numbers of each counter and totalizer the conductor is enabled to make up his day card, which furnishes the basis of his settlement with the receiver in the car house.

As the passenger enters the car he receives a zone check, which is an identification ticket bearing the number of the zone in which the passenger boarded the car. When the passenger approaches his destination he presents his identification check to the conductor.

The registration of a fare by the conductor is as simple as the registration of a sale on the ordinary cash register.

Employees' free tickets will be registered by the simple operation of pressing the ticket key which prints on the detail strip, zero in the money column, followed by the letter "T". Transfers will be registered by pressing the ticket key together with the key representing the amount of money paid by the transfer passenger to the conductor, or in other words, at the rate of one cent per zone for each zone ridden on the transfer. The registration of a fare of a passenger presenting a transfer who has ridden three zones thereon is effected by simultaneously pressing the ticket key and the three-cent key which throws up the three-cent and ticket indicators in the glass section at the top of the register on which the fare is indicated, at the same time printing on the detail strip "03", followed by the letter "T".

The zone indicator can be advanced progressively but cannot be turned back until the complete number of zones on the line has been reached. When this is the case the zone indicator can be operated only in the reverse order.

The process of auditing the work of a conductor is comparatively simple. A representative of the general auditor's office, stationed at each car house, will unlock the fare register at night or while the car is out of service, removing therefrom the used portion of the detail strip which he will insert in an envelope, marking thereon the date, the car number and the line, together with the reading of each totalizer—(1) cash, (2) total passengers, and (3) tickets and transfers. After renewing the supply of detail strip he will again lock the register. The envelopes from the car house clerk, when received in the general auditor's office, will be separated according to the runs in which the cars were employed during the day. The reading of the totalizer as shown by the car house clerk's report will be checked against day cards of the conductors, who were in charge of the car.

Figure 16:
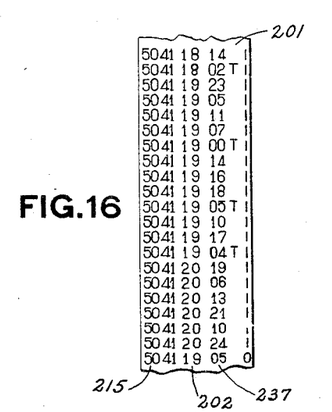
Fig. 16 represents a portion of the record strip printed by the machine.

The audit of a particular trip will be made by taking the trip envelope and the section of the record strip for that trip and comparing the contents of the trip envelope with the record strip. The appearance of the record strip as it comes from the fare register to the general auditor's office is shown in Fig. 16. The story of the entire trip is told on the record strip. The first twenty registrations represent fares collected on the inbound trip, while the last registration represents a fare collected on the outbound trip. The first column to the left contains the conductor's number. It it apparent that the same conductor was in charge of the car throughout the two trips. The second column contains the zone number in which the registration was made; the third column shows the rate of fare paid by each passenger; where nothing follows the amount a cash fare was paid; where a letter "T" follows the amount, the passenger presented a free ticket or transfer. The final column shows the direction in which the car was traveling. An "O" represents an outbound trip; and "I" represents an inbound trip.

Referring specifically to the machine embodying the invention and at this time bearing in mind that all the action thereof is started by the keys prominent at the front of the machine the transfer of motion from the keys to the other parts will now be set forth. The keys 30 are pivoted upon a transverse rod 31, and, when depressed, raise a key coupler 32 which is provided with trunnions 33 journaled in the side frames 42. The oscillatory movement of the key coupler 32 reciprocates a double rack 34 to give a complete revolution to a main operating shaft 35 at each complete operation of a key 30. Attached to the rear end of each key 30 is an upright member 36, (Fig. 3), the uprights 36 being formed with graduated slots 37 adapted when a key 30 is operated to engage a traverse rod 38 carried by rocking frames 39 pivoted on a transverse rod 40 to rock said frame different distances, according to the key 30 depressed. Each of the frames 39 has attached thereto a registering segment 41.

Figure 2:
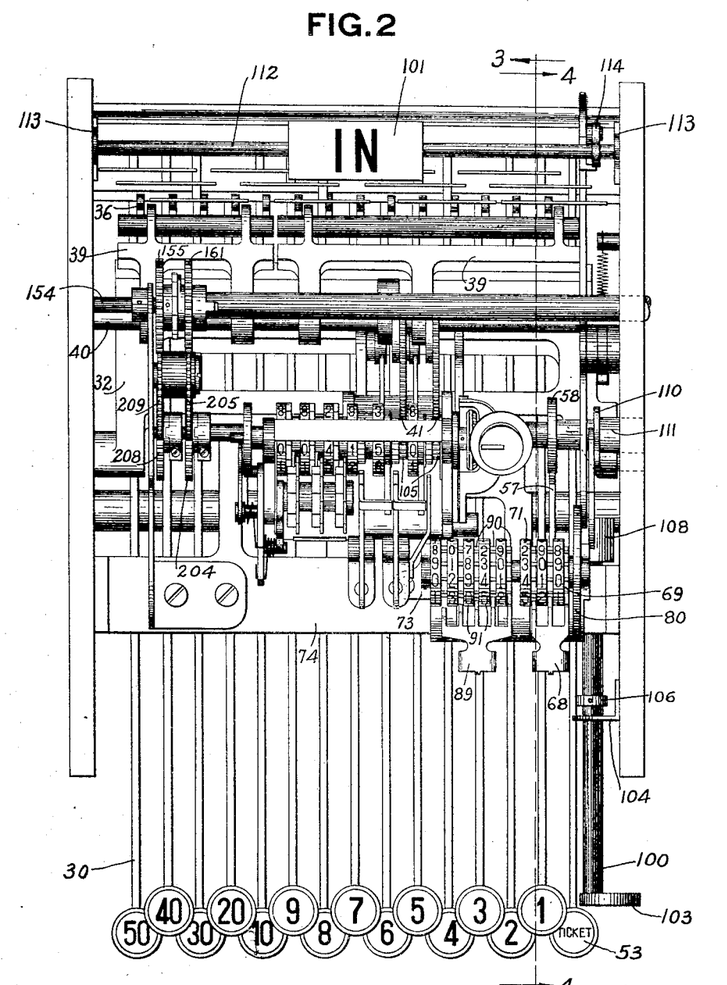
Fig. 2 is a plan view of the machine with the printer and zone control mechanism omitted.
Figure 3:
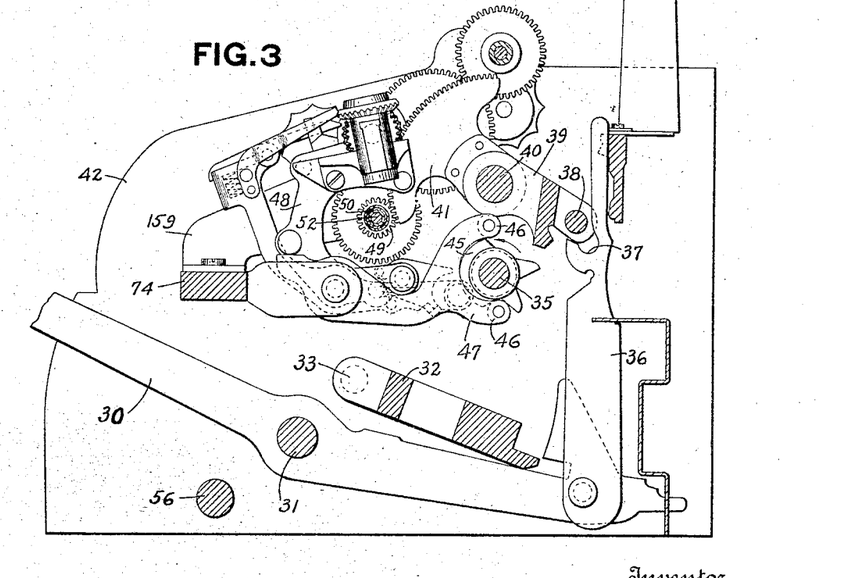
Fig. 3 is a transverse section taken on the line 3—3 of Fig. 2, looking in the direction of the arrows.

In the present machine, there are two rocking frames 39, each of which is provided with the registering segment 41 (Figs. 2 and 3).

When the keys 30 are variously operated, the registering segments 41 are moved different distances to operate the totalizer which is rocked into position to be actuated by the registering segments by means of throwing devices at an appropriate time during each operation of the machine. The throwing devices comprise a cam disk 45 (Fig. 3) mounted on the main operating shaft 35 and acting upon rolls 46 carried by the rearward arms of throwing levers 47, fast to the rocking frame 48 carrying the totalizer.

The totalizer is of the usual form fully described in the aforesaid patents to Cleal and it is sufficient to state here that it comprises a plurality of rotatable elements, each appropriate to a numerical order. The totalizer carries six elements, the two of lower numerical order being each provided with a small pinion 105 (Fig. 2) which, when the totalizer frame is rocked to engage the totalizer with the registering segments 41, will mesh with the registering segments so that the rocking movement of the registering segments will be transmitted to the elements of the totalizer. The additional elements of each totalizer are for the purpose of giving a higher registering capacity to the totalizers, and are adapted to receive the overflow of transfer movements from the wheels of lower order. Any suitable form of transfer mechanism may be employed but it is preferred to employ the form shown in the present application. As this form forms no part of the present invention and is fully set forth in the aforesaid Cleal patents it will not be described here.

The mechanism for resetting to zero the elements of the totalizer is well known in the art and will not be described here.

Each of the segments for the totalizer also meshes with a pinion 49 (Fig. 3). The pinions 49 which mesh with the registering segments 41 are fast on the left hand end of sleeves 50. The sleeves 50 extend to the right and on their right hand ends carry printing wheels for printing the detailed transactions on the record strip in a manner hereinafter described.

Included in the operating mechanism is a special key 53 (Figs. 1, 2 and 4) which has mounted in its forward end a stud 54 which engages with a cam plate 55 fast to a shaft 56. Also fast to said shaft at the right side of the machine is a segment arm 57 (Fig. 4) which meshes with a pinion 58 mounted upon one of the nested sleeves 50, above described, which is to transmit the motion thereof to the printing mechanism and to a type carrier 59 (Fig. 13) which has thereon the letter "T" corresponding to the special key 53.

The ticket key 53 has no connection with the totalizer but actuates a counter each time said key is operated which in this particular case is when a passenger tenders a ticket or transfer. Fast to ticket key 53 is an upright arm 63 (Fig. 4) bifurcated to engage with a pin 64 mounted in a lever 65 pivoted on a rod 66. On the upper end of the lever 65 pivoted upon a stud 67 is a forked pawl 68 held in engagement with ratchet wheels 69 by a spring 70. Fast to the ratchet wheels 69 are numeral wheels 71 mounted upon a shaft 72 which is journalled in a frame member 73, supported by a transverse bar 74.

The actuation of the numeral wheels 71 and the transfer from one wheel to another of higher order at each revolution of a wheel is effected by the stepped pawl 68 and the deep tooth ratchets 69 which construction is well known in the art. For the purpose of preventing retrograde movement of the numeral wheels 71 a pawl 75 pivoted upon the rod 76 carried in the frame member 73 is held into engagement with the ratchet wheels 69 by a spring 77. When it is desired to construct said counter so that the numeral wheels 71 can be reset to a zero position, there is mounted upon a stud 78, in each numeral wheel, a spring controlled pawl 79 the point of which engages with a groove in the shaft 72. Fast on the right hand end of the shaft 72 is a knurled disk 80 which is manually operated in the direction of the arrow (Fig. 4) when resetting the counter to zero.

Figures 4, 7:
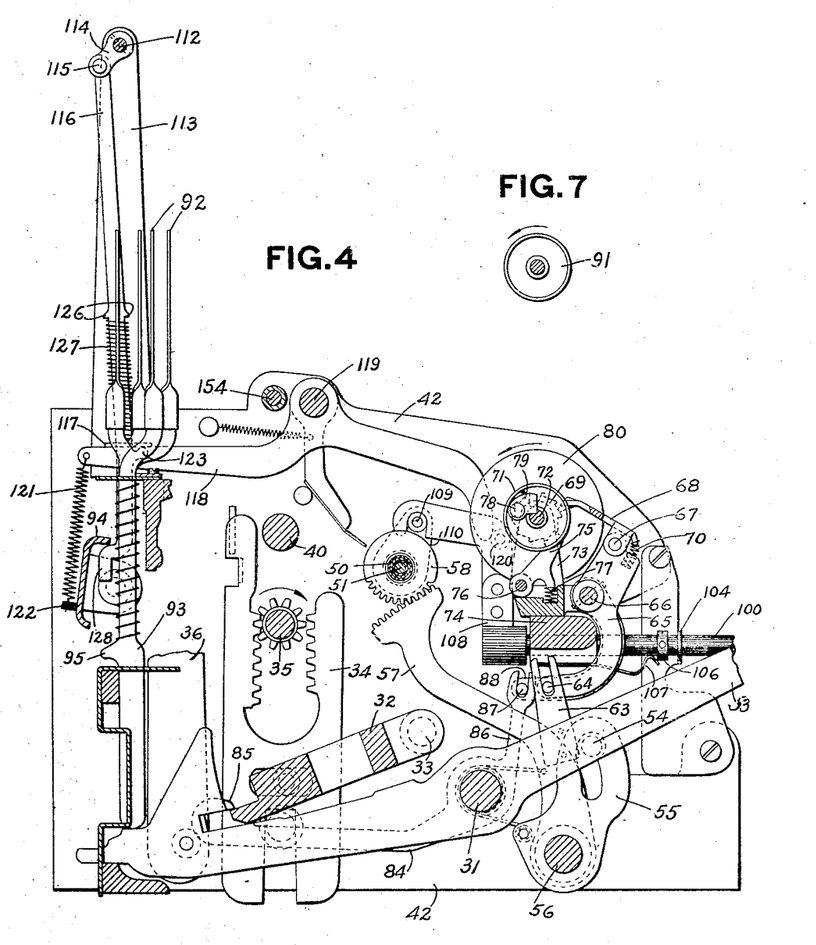
Fig. 4 is a transverse section taken on the line 4—4 of Fig. 2 as indicated by the arrows.
Fig. 7 is a detail view of an accumulator wheel of the total passenger counter.

The passenger counter which contains the total number of registrations made by both the amount keys and the ticket key is mounted in the frame member 73 (Fig. 2) supported by the transverse bar 74. The counter is actuated by a lever 84 fulcrumed upon the rod 31 (Fig. 4). Said lever 84 extends toward the rear of the machine and has a hooked end 85 which engages with the key coupler 32 to receive a rocking motion from the oscillation of the key coupler each time a key 30 or the key 53 is operated. The forward end 86 of the lever 84 is bifurcated to engage with a pin 87 which is mounted in an arm 88 which is fast on the rod 66. Said rod 66 is journalled in the frame member 73 and has fast thereon an arm carrying a forked pawl 89 (Fig. 2) which engages with ratchet wheels 90 which are fast to numeral wheels 91 rotatably mounted upon the shaft 72. The forked pawl 89 actuates the numeral wheels one numeral at each operation and at each revolution of a numeral wheel transferring to the wheel of higher order, all of which is well known in the art. The numeral wheels 91 (Figs. 2 and 7) are constructed so as not to be reset to zero.

The items entered on the totalizer, ticket counter, and on the record strip by the operation of the keys 30 and 53 will be shown to the passenger by a series of indicators 92 (Figs. 1 and 4) which are carried on the upper ends of vertical rods 93, the lower ends of said rods being supported on the rear ends of the keys. A supporting frame 94 is rocked beneath the projection 95 which extends from the rods 93 and supports said rods in elevated position so as to indicate the item recorded in the totalizer, ticket counter and record strip.

Figure 13:
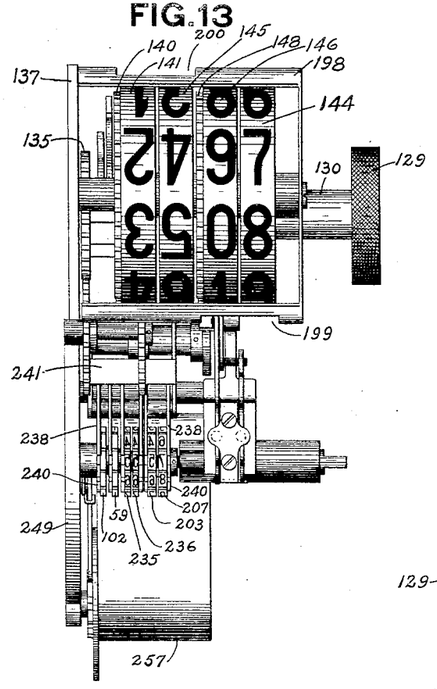
Fig. 13 is a plan view of the mechanism shown in Fig. 12.

In addition to the item keys 30 and the ticket key 53 there is another key 100 (Figs. 1, 2 and 4) which will be known as the "trip" key. This key is located to the right of the other keys and operates an indicator 101 (Figs. 1, 2 and 3) and a type wheel 102 (Fig. 13). Mounted upon the forward end of said key 100 is a disk 103 (Figs. 1 and 2) with the words "In" and "Out" thereon which signify respectively the inbound and outbound trips of the car. The drawings show the register set for an outbound trip with the key 100 in its forward position. Said key 100 is guided in a bracket 104 and the transverse bar 74 (Figs. 2 and 4). Mounted upon the key 100 is a collar 106 which operates against the spring member 107, one end of which is fast to the transverse bar 74. Said spring 107 retains the key 100 in either the "out" or "in" position by cooperating with the collar 106 positioned either in front or back of the formed end of the spring 107.

Figure 1:
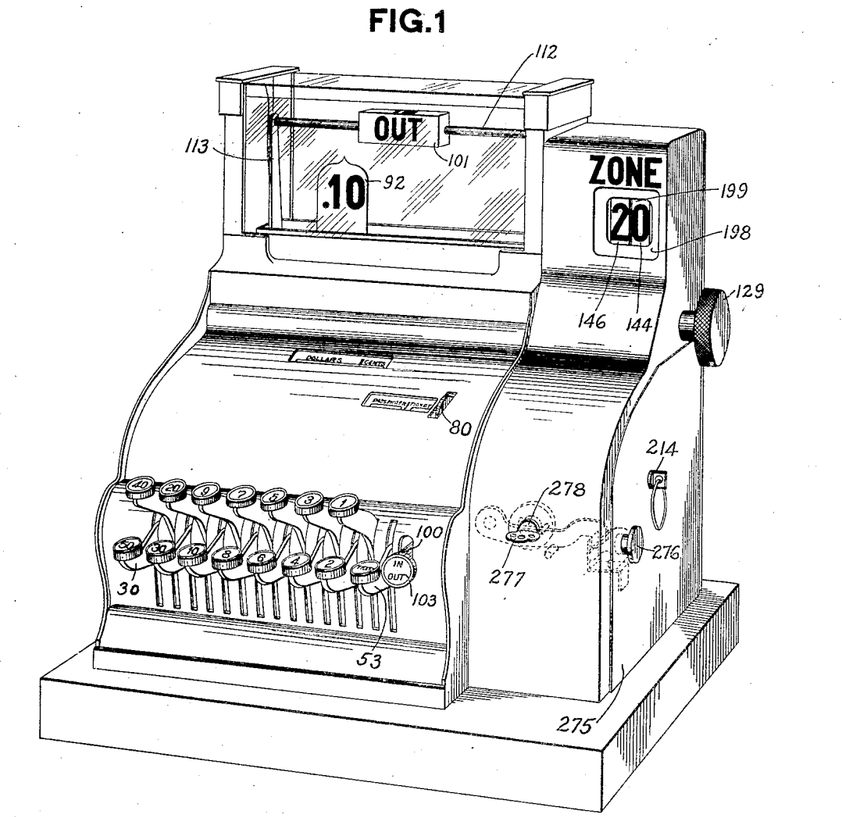
Fig. 1 is a perspective view of the type of machine shown in the Letters Patent to Cleal No. 718,565 and No. 773,060 granted January 13, 1903 and October 25, 1904 respectively, with this invention applied thereto.

Upon the rear end of the key 100 is mounted an arm 108 which extends upward and to the rear to hook over a pin 109 which is fast in one end of an arm 110. The other end of the arm 110 is fast on the left hand end of a sleeve 111 (Fig. 2) which has mounted upon its right hand end the type wheel 102 (Fig. 13) containing the characters "I" and "O" which represent the words shown on the disk 103 (Fig. 1).

The indicator 101 (Figs. 1, 2 and 3) which is controlled by the key 100 displays both to the front and rear of the machine the words "In" and "Out," denoting the in and out trip of the car. This indicator is mounted on a rod 112 which is journalled in brackets 113 extending upward from the frame of the machine.

Pinned to rod 112 near the right side of the machine is an arm 114 (Figs. 2 and 4) which has mounted in its lower end a stud 115. Pivoted on said stud 115 is a vertical rod 116, the lower end of which is guided by a formed lip 117 on a lever 118 which is fulcrumed on a stud 119 mounted in the right frame 42. The forward end of the lever 118 contacts with a pin 120 which is carried in the arm 108 previously described. The lever 118 is held in contact with the pin 120 by a spring 121, one end of which is attached to the rear end of the lever 118 the other end being attached to a pin 122 mounted in the frame 94. Between the lugs 126 on the vertical rod 116 and the formed lip 117 on the lever 118 is a compression spring 127. By the inward movement of the key 100 said spring 127 is further compressed. The lower end 128 of the vertical rod 116 is held by the frame 94 until one or more of the keys 30 and 53 are operated at which time by the action of the spring 127 the vertical rod 116 is forced upward bringing the end 128 above the frame 94. By the upward motion of the vertical rod 116 the indicator 101 is rotated one-quarter of a turn changing the indication from "Out" to "In."

In changing the indicator 101 from the "in" to the "out" position the key 100 (Fig. 4) is drawn forward so that at the first operation of any of the keys 30 or 53 the point 128 will be released by the frame 94, and through the action of the spring 121, which is attached to the lever 118, will cause a downward movement of the vertical rod 116, there being a projection 123 contacting with the under side of the formed lip 117 on the lever 118.

Figure 14:
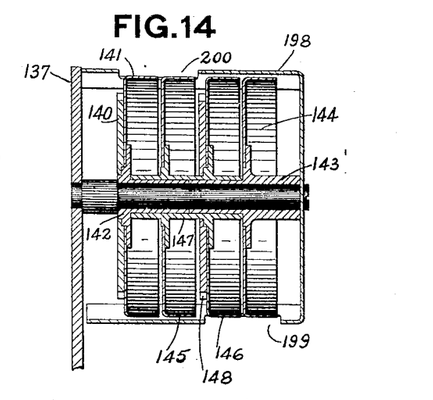
Fig. 14 is a horizontal sectional view of the zone indicators.

To the right of the machine and in line with the item indicators are two sets of roller indicators to indicate the zone in which the car is traveling, one set indicating to the front of the machine, and the other indicating to the rear. These indicators are operated and controlled by a knurled knob 129 (Figs. 1, 13, 15 and 17). Said knob 129 is fast to the right hand end of a sleeve 130, the left hand end of the sleeve 130 being clutched with a companion sleeve 131 (Fig. 17) which has a flange 132 to which is riveted a gear 133, a star wheel 134 and a gear 135. The sleeves 130 and 131 are freely mounted upon a stud 136 which is fast in a plate 137. The gear 133 meshes with a gear 140 which is fast to an indicator wheel 141 (Figs. 13 and 14). The indicator 141 and gear 140 are fast upon a flanged sleeve 142 which is clutched with a companion sleeve 143 having fast to it an indicator 144 which is a companion member to the indicator 141, the indicator 141 displaying to the rear of the machine and the indicator 144 displaying to the front of the machine. These indicators will be known as the "units" indicators. The other two indicators 145 and 146 displaying to the rear and front of the machine respectively, will be known as the "tens" indicators and are brought into operation at the time the "units" indicators are passing from the ninth to the tenth zone and every zone thereafter. Said indicators 145 and 146 are fast to a sleeve 147 which is freely mounted upon the sleeves 142 and 143. Fast to the indicator 146 and sleeve 147 (Fig. 14) is a gear 148 which meshes with a gear 149 mounted upon and pinned to a sleeve 150 (Fig. 17) which surrounds the sleeves 130 and 131 loosely so as to rotate independently of said sleeves.

Figures 5, 6:
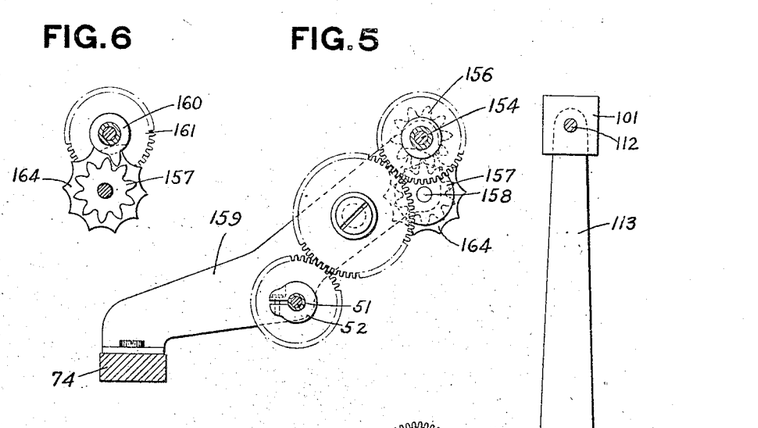
Fig. 5 is a transverse section taken on the line 5—5 of Fig. 17, looking in the direction of the arrows.
Fig. 6 is a detail view of part of the transfer mechanism shown in Fig. 5 looking in the opposite direction.
Figure 15:
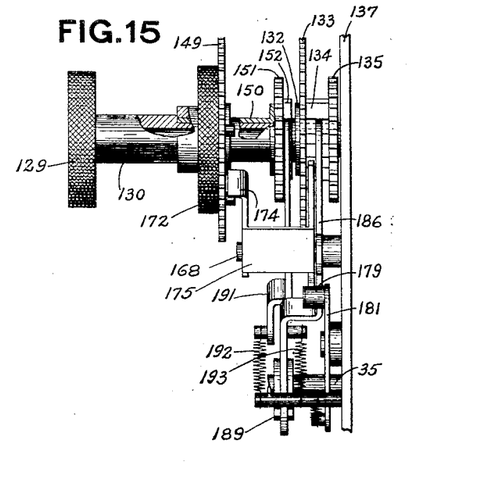
Fig. 15 is a rear elevation of the zone control mechanism.
Figure 17:
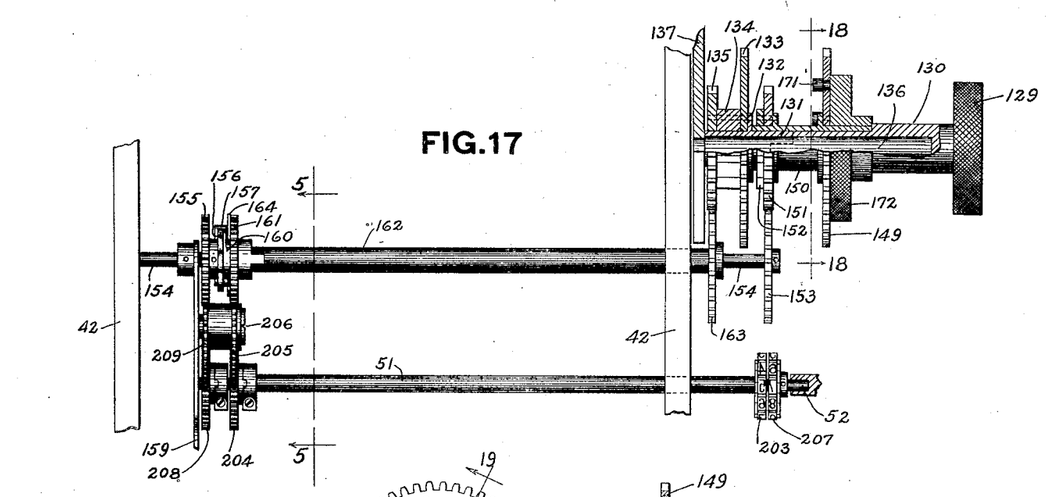
Fig. 17 is a plan view, partially in section, of the zone printing and indicating mechanism.

Mounted upon and fast to the left hand end of sleeve 150 is a gear 151 and a star wheel 152 (Fig. 15 and 17). Meshing with the gear 151 is a gear 153 which is fast upon the right hand end of a shaft 154, said shaft being journalled in the framework of the machine. Mounted upon and pinned near the left hand end of shaft 154 is a gear 155 (Fig. 17). Fast to the gear 155 is a gear 156 which meshes with a gear 157 pivoted on a stud 158 mounted in a bracket 159 which is supported by the transverse bar 74 and the shaft 154. The gear 157 (Figs. 5, 6 and 17) is of sufficient width to engage with a transfer member 160 as well as the gear 156. The transfer member 160 is mounted upon and fast to a gear 161, said gear 161 being freely mounted upon the shaft 154 and clutched to a sleeve 162 which extends through the right frame 42 and has mounted upon its right hand end a gear 163 which meshes with the gear 135 which has previously been described. By the turning of the knurled knob 129 to rotate the units indicators 141 and 144, the gear 161 through the gear connections 135 and 163 and the sleeve 162 will at each rotation engage the transfer member 160 with the gear 157 and rotate said gear 157 one-tenth of a revolution. Said gear 157 is retained in placed position during the remainder of the revolution of the transfer member 160 by the disk 164 contacting the hub of the transfer member 160 which mechanism is well known in the art.

Each movement of the gear 157 (Figs. 5 and 6) is carried to the tens indicator wheels 145 and 146 by the gear 156, shaft 154, and the gear 153 which is connected to the train of gears operating the tens indicators, to rotate these indicators one space at each complete revolution of the unit indicator wheels, whether they be going in a clockwise direction or anti-clockwise.

Figure 18:
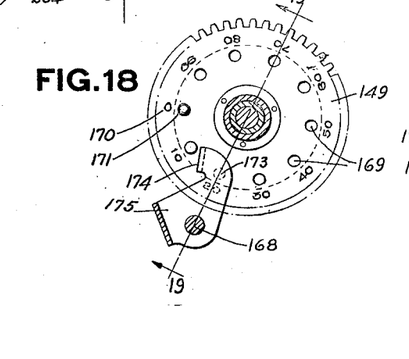
Fig. 18 is a transverse section of the zone indicating mechanism taken on the line 18—18 of Fig. 17, looking in the direction of arrows.
Figure 19:
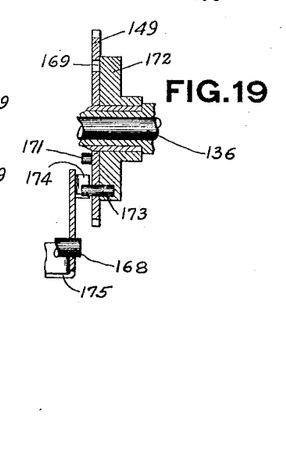
Fig. 19 is a transverse section of the zone index mechanism taken on the line 19—19 of Fig. 18, looking in the direction of the arrows.

For the purpose of governing the number of zones indicated and recorded by the register, a number of holes 169 (Fig. 18) are equally spaced on a circle in the gear 149. In this particular case they represent multiples of 10 and as Figure 18 shows this machine will take care of 99 zones. In the zero position 170 is a permanent pin 171 which is fast in the gear 149. Mounted in a knurled wheel 172 (Figs. 17 and 19) is a pin 173 which will engage with any of the holes 169 to act as a determining means for a certain number of zones. The drawings show the pin 173 positioned in the 20 hole. To position said pin 173 in any of the holes 169 in the gear 149 the knurled knob 129 (Fig. 17) is given a sliding motion toward the right which enables the knurled wheel 172 to be drawn to the right also disengaging the pin 173 from the gear 149. In this position the knurled wheel 172 can be rotated to a position bringing the pin 173 in line with a hole 169 corresponding to the number of zones required for the outbound trip of the car.

If for example the number of zones in a trip is 56, the pin 173 is placed in the hole marked by the index Figure 60. In a case of this kind when the car has reached the 56th zone, which is the end of the trip, the operator continues turning the knurled knob 129 until the zone indicators display the numeral 60 at which time the mechanism will be tripped so that the knurled knob 129 can be rotated in the opposite direction for the in-bound trip.

The tripping of the mechanism which allows reverse movement of the knurled knob 129 is effected by the pin 173 (Figs. 18 and 19) as it contacts with a formed lip 174 of the frame 175, which is pivoted on a stud 168 mounted in the plate 137, thereby rocking said frame 175 to carry the point 176 (Fig. 12) of the frame 175 out of engagement with the star wheel 134 and the end 177 into engagement with said star wheel 134.

The ends 176 and 177 of the frame 175 (Figs. 12 and 15) are so formed as to allow the star wheel 134 to rotate in one direction either clockwise or counter-clockwise according to the end that is engaged with the star wheel. The frame 175 is retained in engagement with the star wheel by the point 178 contacting with a roller 179 mounted on the stud 180 carried in the end of a lever 181 pivoted upon a stud 182 mounted in the plate 137.

Attached to the lower end of the lever 181 is a spring 183 which causes the roller 179 to always bear against one side or other of the point 178.

On the in-bound trip the gear 149 (Fig. 18) will rotate in a counter-clockwise direction until the pin 171 contacts with the formed lip 174 and carries the frame 175 in a clockwise direction a sufficient distance to carry the point 178 (Fig. 12) to the opposite side of the roller 179. In this position the mechanism has been tripped to enable the knurled knob 129 to be turned in a direction for an out-bound trip.

Pivoted on the stud 168 is a lever 186 (Fig. 12), the upper end 187 of which engages with the star wheel 134. The lower end 188 of the lever 186 is so formed as to ride on the periphery of a disk 189 fast to the main operating shaft 35 so that during the operation of any of the keys 30 and 53 (Fig. 1) the zone indicators are locked against operation. The lever is normally held in this position by a spring 193 (Fig. 15). This lever 186 will also lock the keys 30 and 53 against operation by the end 188 (Fig. 12) entering a slot 190 in the disk 189, should the zone indicator setting knob 129 be held at a point between the divisions of the star wheel 134.

For the purpose of aligning the tens indicators 145 and 146 (Fig. 13) a lever 191 (Fig. 12) fulcrumed on the stud 168 engages with the star wheel 152 (Fig. 15), said lever 191 being held in contact with the star wheel 152 by a spring 192 attached to the lower end of said lever.

A permanent shield 198 (Figs. 1, 12, 13 and 14) partially surrounds the zone indicators and is provided with an opening 199 in the front and a similar opening 200 in the rear to display the zone numbers.

In addition to indicating the zones a permanent record of the zone is made upon a record strip 201 (Fig. 16) shown in a column 202. A units type wheel 203 (Fig. 17) is mounted upon the right hand end of the sleeve 51. This sleeve extends through the frame 42 to the left side of the machine. On the left hand end of said sleeve 51 is attached a gear 204 which meshes with an intermediate gear 205 which is pivoted upon a stud 206 mounted in the bracket 159. This intermediate gear 205 also meshes with the gear 161 which is connected to the zone setting knob 129 previously described. Driven in a similar manner is a type wheel 207 which is fast on the right hand end of the shaft 52. This type wheel makes a record of the zone indicated by the tens zone indicator, being connected to the mechanisms of said zone indicator by having a gear 208 fast on the left hand end of shaft 52. Said gear 208 is in mesh with an intermediate gear 209 freely mounted upon the stud 206 and meshing with the gear 155 which is pinned to the shaft 154 connected to the tens zone indicator by mechanism previously described.

Figures 8, 9, 10, 11, 12:
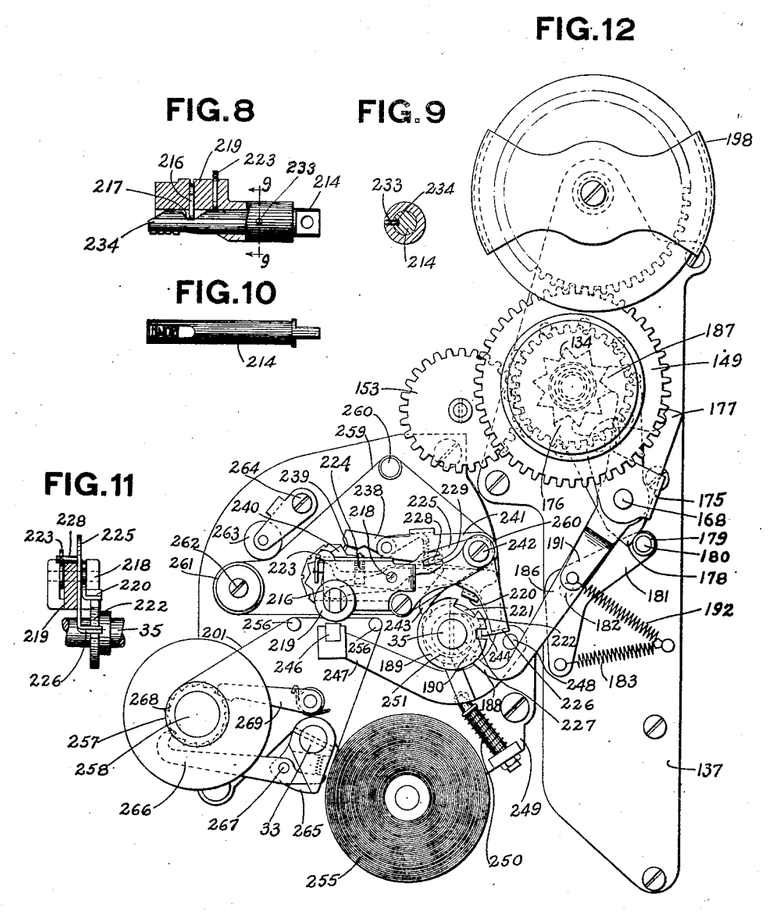
Fig. 8 is a detail view partially in section of the machine lock with the operator's key in the unlocked position.
Fig. 9 is a transverse section of the machine lock and key taken on the line 9—9 of Fig. 8.
Fig. 10 is a detail view of the operator's key.
Fig. 11 is a detail view of the machine lock mechanism in connection with the main driving shaft.
Fig. 12 is a side elevation of the printing and zone indicating mechanism.

The register is locked against operation until a special key which is known as the "conductor's" key 214 (Figs. 1, 8, 9 and 10) is inserted through an opening in the cabinet to the printing mechanism. This key 214 (Fig. 10) has, engraved on the side near the left hand end, numerals which represent the conductor's number. This number is shown on the record strip 201 (Fig. 16) in column 215. Said key 214 is held in place by a lever 216 (Figs. 8 and 12) which rests on the bottom of a notch 217 in the key 214. Said lever 216 is pivoted on a stud 218 (Fig. 12) mounted in the framework 219 (Figs. 8 and 12). This lever 216 extends to the rear and has near the rear end a formed-up lip 220 which engages a notch 221 in a disk 222 fast on the main driving shaft 35. The purpose of this formed lip and notch is to lock the machine against operation should the conductor's key 214 not be in its proper position which is the case when the key is not entirely in the bracket 219 and the lever 216 rests upon the side of the slot 217.

If the conductor's key 214 be removed entirely from the machine, a lever 223 (Figs. 8, 11 and 12) pivoted upon the stud 218 will swing downward under the action of a spring 224 and cause a companion lever 225 which has a formed-up lip 226 to engage with a notch 227 in the disk 222, the lever 225 being connected to lever 223 by a pin 228 projecting from lever 225 engaging with a slot 229 in lever 223. When the conductor's key 214 is inserted into place it will force the lever 223 upward which will raise the formed lip 226 of lever 225 out of the notch 227 thereby unlocking the machine for operation.

To prevent an improper position of the conductor's key 214 in the frame 219 a pin 233 (Figs. 8 and 9) which is held in the frame 219 enters a groove 234 in the conductor's key 214. This pin also prevents the key from taking any rotating motion.

Referring again to the nested sleeve 50 upon the shaft 51 suitably mounted in the framework of the machine (Figs. 3 and 4) there are to be found on the right hand end and fast thereto type wheels 235 and 236

(Fig. 13). These type wheels print on the record strip 201 (Fig. 16) in column 237 the amounts registered by the keys 30 (Fig. 1) which is the fare collected from the passenger.

In order to align the type carriers 102, 59, 235, 236, 203 and 207 (Figs. 12 and 13) spring pressed pawls 238 are thrown into contact with aligning notches 239 formed on the periphery of disks 240 fast on and moving with the type carriers. The spring pressed pawls 238 are carried in a frame 241 fulcrumed on a stud 242 and rocked in and out of engagement with said aligning disks 240 by the forked ends 243 and 244 of the frame 241 contacting with a cam on the main driving shaft 35.

Simultaneously with the engagement of the aligning pawls 238 in the notches 239 of the disks 240 a platen 246 (Fig. 12) will be released to permit of its taking an impression from the adjusted type wheels. This platen 246 is mounted in the forward end of an arm 247 pivoted upon a stud 248 projecting from a printer frame 249, which is an adjunct to the main frame of the machine and carries the printing mechanism. This arm 247 is held by a spring actuated plunger 250 in contact with a cam 251 secured to the driving shaft 35. The form of this cam 251 is such that by a one-half rotation of the shaft 35 the cam will rock the arm 247 about the stud 248 against the action of the spring actuated plunger 250 and as the high point of the cam 251 passes the point of contact with the lever 247 said lever will be released to permit the spring actuated plunger 250 to carry the platen 247 into contact with the aligned type of the type carriers.

The printing from the foregoing type mechanism is performed upon a record strip 201 (Figs. 12 and 16) which is run from a supply roll 255 around two guide rollers 256 to a receiving roll 257 mounted upon the stud 258 carried in the printer plate 249. This record strip in passing from the supply roll to the receiving roll passes between the type carriers and the platen 246 so that when the platen is operated, as previously described, an impression will be made on said strip. To secure a visible impression a suitable continuous inking ribbon 259 is wound around guide rolls 260 projecting from the printer plate 249, and over an inking roller 261 mounted upon a stud 262 projecting from the printer plate. This ribbon 259 is held taut by a tension roller 263 under gravity tension, supported in a frame mounted upon a stud 264 projecting from the printer plate. The ribbon is fed at each operation of the record keys 30 and 53 to bring a new inking surface between the platen and the type. The inking ribbon is fed by a train of gears connecting the inking roll 261 to the record strip storage roll 257, said train of gears being actuated at each operation of the key coupler 32 as will be described latter.

The oscillating stud 33 upon which the key coupler oscillates has fastened to it an arm 265 (Fig. 12) which carries a spring held pawl 266 pivoted on a pin 267. The forward end of said pawl 266 engages with the teeth of a ratchet 268 and at each operation of the key coupler 32 will move the ratchet wheel 268 in a counter-clockwise direction which will be retained against retrograde movement by a spring actuated pawl 269. Thus the receiving roll 257 being fast to the ratchet wheel 268 will feed the record strip 201 and transmit the necessary motion through a train of gears to the inking roll 261. The train of gears is not shown in this case as the structure is well known in the art and is shown in the aforesaid Cleal Patent No. 718,565.

To remove the record strip from the register a hinged door 275 (Fig. 1) is provided in the side of the cabinet. Said door is locked in closed position by a latch mechanism shown dotted which is released by turning the knob 276 in a clockwise direction after the removable key 277 has unlocked the latch.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination of an adjustable setting element adapted to receive a step by step adjustment, means normally compelling the adjustment of said setting element in one direction, means for reversing the effectivity of said compelling means whereby the adjustment of the setting element in the reverse direction is compelled, and adjustable means for predetermining the number of steps of adjustment which said adjustable element is to receive in either direction.

2. In a machine of the class described, the combination of an adjustable element adapted to receive a step by step adjustment, means normally effective to compel the adjustment of the adjustable element in one direction, and differentially adjustable means for arresting the adjustment of the adjustable element after a predetermined number of steps of adjustment and reversing the effectivity of the compelling means whereby the adjustment of the adjustable element in the reverse direction is compelled.

3. In a machine of the class described, the combination of a differentially adjustable element adapted to receive a step by step adjustment, indicating mechanism for indicating the position of adjustment of the adjustable element, connections intermediate the adjustable element and the indicating mechanism whereby the latter is adjusted upon each adjustment of the former, means normally effective to compel the adjustment of the adjustable element in one direction, and means effective after a predetermined number of steps of adjustment in one direction for arresting the movement of the adjustable element in that direction and reversing the effectivity of the compelling means whereby the adjustment of the adjustable element in the reverse direction is compelled.

4. In a machine of the class described, the combination of a differentially adjustable element adapted to receive a step by step adjustment, printing means for printing the position of adjustment of the adjustable element, connections intermediate the adjustable element and the printing mechanism whereby the latter is adjusted upon each adjustment of the former, means normally effective to compel the adjustment of the adjustable element in one direction, and means effective after a predetermined number of steps of adjustment in one direction for arresting the movement of the adjustable element in that direction and reversing the effectivity of the compelling means whereby the adjustment of the adjustable element in the reverse direction is compelled.

5. In a machine of the class described, the combination of a differentially adjustable element adapted to receive a step by step adjustment, accounting means, connections intermediate the adjustable element and the accounting means whereby the latter is adjusted upon each adjustment of the former, means normally effective to compel the adjustment of the adjustable element in one direction, and means effective after a predetermined number of steps of adjustment in one direction for arresting the movement of the adjustable element in that direction and reversing the effectivity of the compelling means whereby the adjustment of the adjustable element in the reverse direction is compelled.

6. In a machine of the class described, the combination of an adjustable element adapted to receive a step by step adjustment, a plurality of accounting elements each appropriate to certain numerical order, connections intermediate the adjustable element and the accounting element of lowest order whereby the latter will be given a step of adjustment upon each adjustment of the former, connections intermediate an accounting element of lower order and an accounting element of higher order whereby an accounting element of higher order will receive a step of adjustment upon the completion of a predetermined extent of adjustment of an element of lower order, means normally effective to compel the adjustment of the adjustable element in one direction only, an adjustable means for predetermining the number of steps of adjustment to be given said adjustable element, and means controlled thereby for reversing the effectivity of said compelling means whereby the adjustment of the adjustable element in the reverse direction is compelled.

7. In a machine of the class described, the combination of a plurality of key levers, an operating device common to all of said key levers and operated upon the operation of any one of said levers, printing mechanism for printing characters appropriate to the key levers operated, an insertible printing element for printing a special character in connection with said printing of the characters appropriate to the key levers operated, and locking means controlled by said insertible printing element for locking said operating device until the insertible printing element is inserted.

8. In a machine of the class described, the combination of a plurality of manipulative devices, an operating device common to all of said manipulative devices and adapted to be operated upon the actuation of any of said manipulative devices, printing means for printing characters representing the manipulative devices which are operated, an insertible printing element, and locking means controlled thereby for preventing an operation of said operating device unless said insertible printing element is in proper printing position.

9. In a machine of the class described, the combination of a plurality of manipulative devices, an operating device common to all of said manipulative devices and adapted to be actuated upon the actuation of any one of said devices, printing means for printing characters representing the manipulative devices which have been operated, an insertible printing element for printing a character in connection with the aforesaid printing means, a notched disk carried by the operating device, and levers adapted to cooperate with said notched disk and the insertible printing device whereby the operation of the operating device is prevented in the absence of an insertible printing element.

10. In a machine of the class described, the combination of a plurality of manipulative devices, an operating device common to all of said manipulative devices and adapted to be actuated upon the actuation of any one of said devices, printing means for printing characters representing the manipulative devices which have been operated, an insertible printing element for printing the character in connection with the aforesaid printing means, a notched disk carried by the operating device, and levers adapted to cooperate with said notched disk and the insertible printing device whereby the operation of the operating device is prevented unless an insertible printing element is in proper printing position.

11. In a machine of the class described, the combination of an adjustable setting element adapted to be given a step by step adjustment, means compelling the adjustment of said element in one direction for a predetermined number of steps, means effective upon the completion of the predetermined number of steps in one direction whereby a like adjustment of the adjustable element in the reverse direction is compelled, and indicating means for indicating at all times the position of adjustment of the adjustable element.

12. In a machine of the class described, the combination of an adjustable setting element adapted to be given a step by step adjustment, means compelling the adjustment of said element in one direction for a predetermined number of steps, means effective upon the completion of the predetermined number of steps in one direction whereby a like adjustment of the adjustable element in the reverse direction is compelled, and printing means for printing characters representing the position of adjustment of the adjustable element at any time.

13. In a machine of the class described, the combination of an adjustable setting element adapted to be given a step by step adjustment, means compelling the adjustment of said element in one direction for a predetermined number of steps, means effective upon the completion of the predetermined number of steps in one direction whereby a like adjustment of the adjustable element in the reverse direction is compelled, and a plurality of indicating means controlled by said single adjustable setting element for indicating the position of adjustment of said setting element.

14. In a machine of the class described, the combination of an adjustable setting element adapted to receive a step by step adjustment, means compelling the adjustment of the adjustable element in one direction, means for predetermining the number of steps of adjustment and for reversing the effectivity of said compelling means whereby a step by step adjustment in the reverse direction is compelled, and a plurality of accounting elements controlled by said single adjustable setting element for indicating by their positions at all times the position of adjustment of the adjustable setting elements.

15. In a machine of the class described, the combination of an adjustable setting element adapted to receive a step by step of adjustment, a plurality of accounting elements each appropriate to a certain numerical order, connections intermediate the adjustable element and the accounting element of lowest order whereby the latter will be given a step by step adjustment upon any adjustment of the former, connections intermediate an accounting element of lower order and an accounting element of higher order whereby an accounting element of higher order will receive a step of adjustment upon the completion of a predetermined extent of adjustment of an element of lower order.

16. In a machine of the class described, the combination of an adjustable setting element adapted to receive a step by step adjustment, means normally effective to compel the adjustment of the adjustable element in one direction, and means comprising a disk and relatively adjustable obstructions carried by said disk for predetermining the number of steps of adjustment to be received by said adjustable element and for reversing the effectivity of said compelling means when the adjustable element has received its predetermined extent of adjustment to compel the adjustment of an adjustable element in the reverse direction.

17. In a machine of the class described, the combination of an adjustable element adapted to receive a step by step adjustment, means normally effective to compel the adjustment of the adjustable element in one direction, and means for predetermining the extent of adjustment to be given the adjustable element in one direction and effective to reverse the effectivity of the compelling means upon the completion of the predetermined extent of adjustment whereby to compel the adjustment of the adjustable element in the reverse direction, said predetermining means comprising a disk and relatively adjustable obstructions on said disk.

18. In an accounting device for accumulating amounts consisting of a plurality of digits, means for actuating the accounting element for one digit, means for actuating the accounting element for another digit, and adjustable means operated by one of said actuating means for limiting the amount that may be accumulated in its accounting element and for causing the other to be simultaneously arrested at zero.

In testimony whereof I affix my signature.

EDWARD J. VON PEIN.